Oct. 14, 1947.                    M. B. BECK                    2,428,827
MANNER AND MEANS FOR ILLUMINATING ROOM SPACE
Filed Jan. 6, 1944                              3 Sheets-Sheet 3
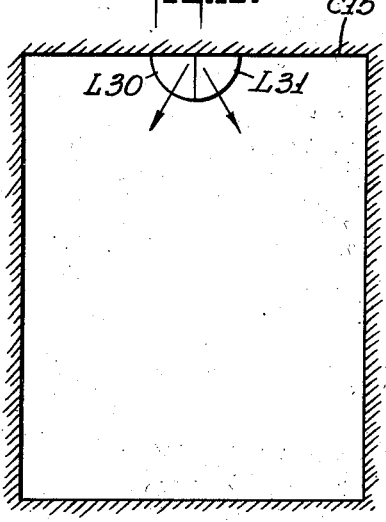
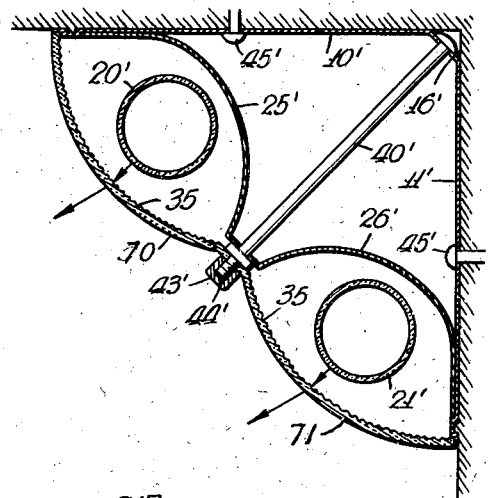
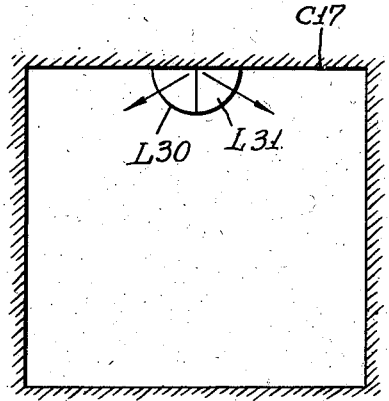
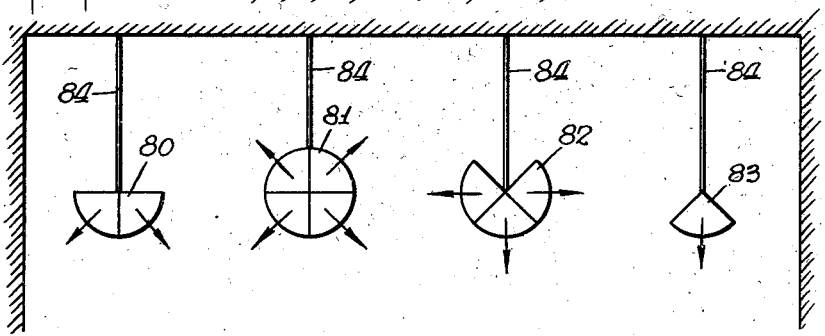
INVENTOR
*Morris B. Beck*
BY
ATTORNEYS Patented Oct. 14, 1947

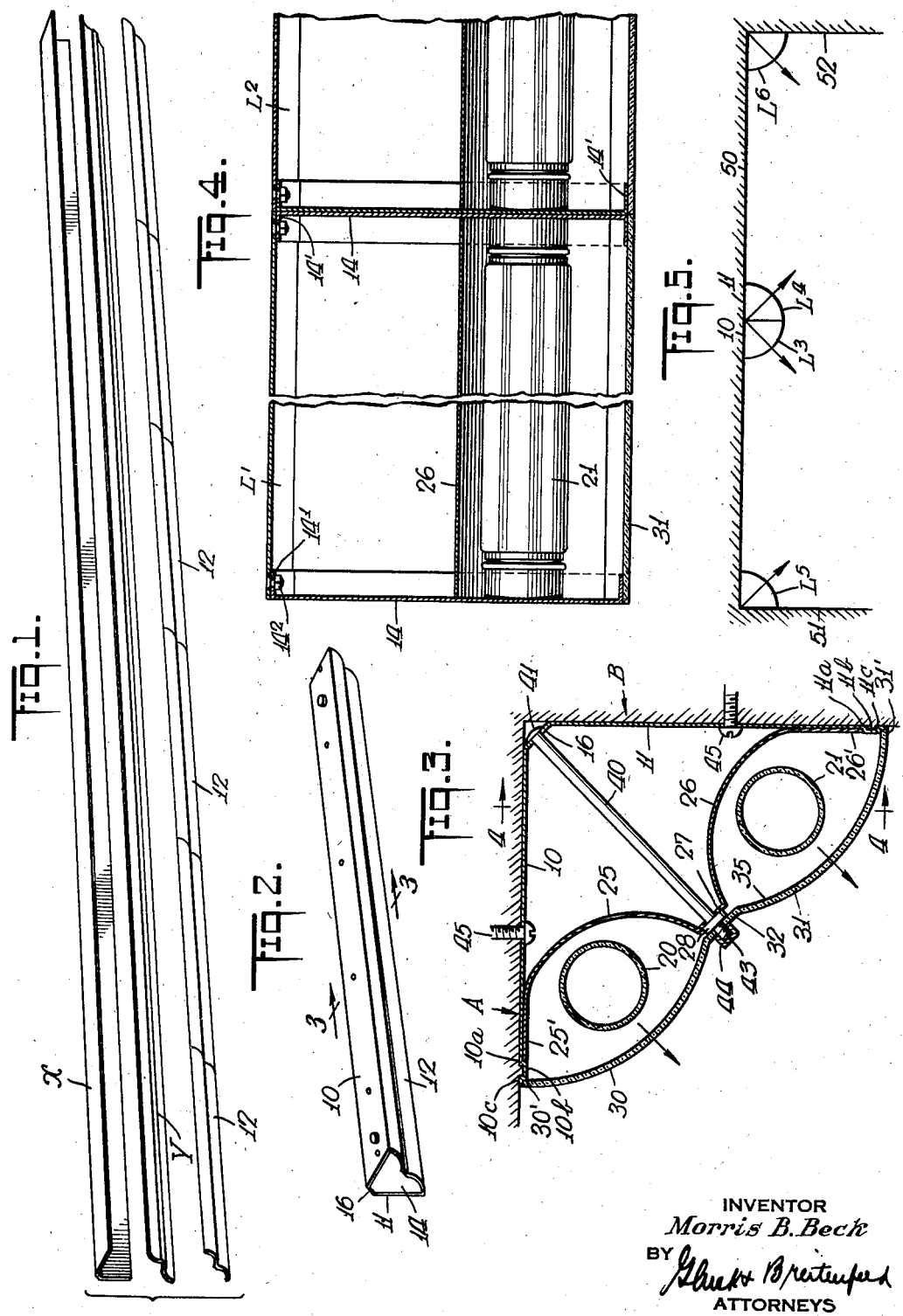

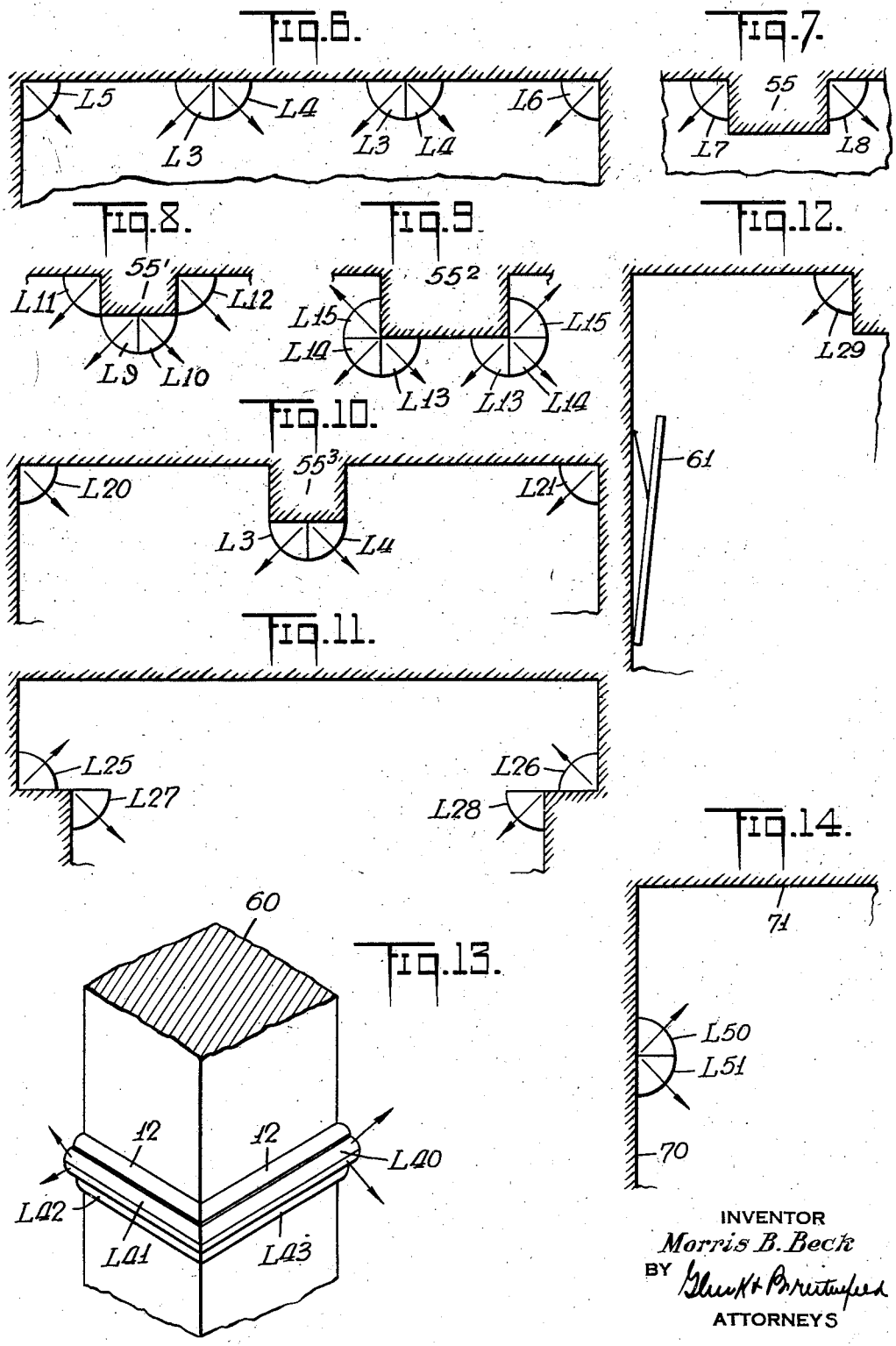

2,428,827

UNITED STATES PATENT OFFICE 2,428,827

MANNER AND MEANS FOR ILLUMINATING ROOM SPACE

Morris B. Beck, Lawrence, N. Y.

Application January 6, 1944, Serial No. 517,191

7 Claims. (Cl. 240—9)

1

The present invention is concerned with the art of illuminating rooms, emporiums, auditoriums and the like.

It is among the objects of the invention to illuminate a room by resort to a luminous trimming longitudinally along wall or ceiling surfaces to create the effect of costly custom-built architecturally designed illumination, but which involves nothing more than a simple arrangement of a multiplicity of lighting units of relatively simple design.

Another object is to provide as a lighting unit for use in the type of installation referred to, a self-contained inexpensive and rugged illuminating block structure which includes the source of light, the reflector therefor and the light-diffusing face plate, and which block is so constructed that a multiplicity thereof may readily be installed distributively or in sequence laterally, longitudinally or both laterally and longitudinally, to expose to view solely the illuminated face plate of each block in any desired arrangement of complete installation.

Another object is to provide an illuminating block of standardized construction, which not only admits of ready relamping but which admits of selective replacement of an optically directive element thereof, such as the light-diffusing face plate, to adapt for specialized purposes, any illuminating block or sequence of blocks that make up a lighting installation as, for instance, for directing light to the floor from an unusually high ceiling or to a picture from an opposite wall, all without in the least interfering with the positioning of the individual illuminating blocks, or with the luminous trimming effect of the installation as a whole.

For the attainment of these objects and such other objects as may hereinafter appear or be pointed out, I have illustrated embodiments of my invention in the drawings wherein:

Figure 1 shows elements from which my luminaire may be contrived;

Figure 2 is a perspective view of a luminaire in accordance with my invention;

Figure 3 is a vertical cross section on an enlarged scale taken on lines 3—3 of Figure 2 looking in the direction of the arrows;

Figure 4 shows a manner whereby a plurality of luminaires can be assembled end to end;

Figures 5 to 14 inclusive illustrate various positions, relations and combinations of luminaires and characters of room space illumination permitted by my luminaire and system of illumination;

2

Figure 15 shows the illuminating effect of the modified luminaire of Figure 16 in one type of room space;

Figure 16 shows a modified luminaire;

Figure 17 shows its illumination effect in another type of room space; and

Figure 18 illustrates a few variations of a somewhat different arrangement permitted by my invention for affixing a luminaire or an associated group of luminaires in a room space to give still further and varied illuminating effects.

The unit which serves as the luminous block is illustrated in Figures 2 and 3 of the drawings. It comprises the longitudinally extended members or portions 10, 11, and 12 joined edge to edge along their longitudinal edges to complete a hollow triangularly cross-sectioned or wedge-shaped casing which is closed at its opposite ends by end sections or members 14.

The members 10 and 11 which form two walls or sides of the triangular unit are at right angles to each other and are illustrated as integrally connected by the narrow web 16 angularly related to both walls. These walls and the end closure members 14 may be formed of any satisfactory material such as sheet metal. The front closure member 12 which closes the opening between walls 10 and 11, is formed of a light transmitting material such as glass or plastic.

The light source contained in the encasement is of the fluorescent lamp type. In Figure 3 I show the use in the luminaire of two fluorescent lamps 20 and 21 supported in any preferred or desired manner lengthwise of the encasement and in spaced relation to each other and symmetrically to opposite sides of the plane which bisects the 90° angle between the walls 10 and 11. They are shown in Figure 4 (to which reference will be made later) as mounted with their ends engaged with and supported from the opposite end closures 14.

The light distributing means or medium is comprised of a reflector interposed between the fluorescent lamps and the walls 10 and 11. For the embodiment of Figure 3 wherein two fluorescent lamps are employed, the reflector is of a composite type in that it is comprised of the two spaced apart reflectors 25 and 26 preferably although not necessarily formed integrally and shown as connected by an integrally formed narrow web or strap 27. These reflectors 25 and 26 each cooperates with its adjacent fluorescent lamp which it parallels and partly encases. The two reflectors 25 and 26 also are positioned symmetrically to opposite sides of the plane which bisects the 90° angle between the two walls 10 and 11. The reflecting surfaces can be provided by a polishing operation or by a coating of a reflecting medium such as silver or in any other preferred or desired manner.

The light transmitting front closure member 12 is also shown as comprised of two spaced apart portions 30 and 31 which may be formed integrally and connected by the relatively narrow band or strap 32. The portions 30 and 31 are each contoured to cooperate with that light reflector 25 or 26 which is in opposition thereto and with the fluorescent lamp positioned therebetween in the manner and for the purpose shortly to be pointed out.

It will be observed that, when the parts are assembled as shown in Figure 3, the unit is composite in that it is comprised of two lighting entities which are substantial duplicates and which are arranged symmetrically in the encasement and side by side. Each entity is comprised of a fluorescent lamp, a reflector to its rear, and a light transmitting closure to the front thereof. It will be observed that the reflectors 25 and 26 are contoured alike and that this contour is such that the light is projected from the luminaire by each in a direction which approximates an angle of 45° to both walls 10 and 11. So also the front closure portions 30 and 31 are contoured alike and are symmetrically positioned with relation to the plane which bisects the 90° angle between the walls 10 and 11. The portions 30 and 31 of the light transmitting closure member 12 may be treated or be of a character so that it will serve as a light diffusing medium where it is desired to eliminate the glare of direct illumination.

It will be observed that the walls 10 and 11 are shown as dimensioned alike, and that the contours and dimensions of the composite reflector are such that it can be received between and in nested relation to these walls 10 and 11 and in a position angularly therebetween with its outer or end portions 25′ and 26′ engaged against the outer ends of the respective walls 10 and 11 and terminating short of the ends of the respective walls and engaging against the abutment shoulders 10a and 11a at the inner end of the ridges 10b and 11b formed adjacent to the free outer ends of the members 10 and 11. The front closure member 12 is also received between walls 10 and 11. Its dimensions and contours are such that its longitudinal edges 30′ and 31′ also terminate short of the longitudinal outer edges of the composite wall structure 10—11 and engage beneath the outer abutment shoulders 10c and 11c formed at the other end of the ridges 10b and 11b.

When the parts are assembled as in Figure 3, straps 16, 27 and 32 are in registration in the plane which bisects the 90° angle between the walls 10 and 11 as are also openings provided in these straps. The parts are maintained assembled as by bolts 40 which engage through the registering openings in the three straps and are secured against release by threaded caps 44 which engage the threaded ends 43 of the bolts.

The following observations will be made of the luminous unit or block of Figure 2. It is wedge-shaped and approximates either a cylindrical sector or a triangular prism; its cross section approximates a sector of a circle and its perimeter is defined by three planes of which two are radial (hitherto referred to as walls 10 and 11) and the third (hitherto identified as closure member 12) subtends the angle therebetween; the radial walls 10 and 11 intersect along a line which will be termed the apex of the prism; the angle between walls 10 and 11 is a 90° angle; the encasement is of uniform cross section throughout its length and is symmetrical with reference to a radial plane midway between walls 10 and 11 and therefore either wall can be identified as wall 10 and the other as wall 11.

The following observations will be made of the showing in Figure 3; A and B represent two surface areas in the room either or both of which may be considered as either horizontal or vertical a unit may without modification, be affixed to either area with either of its wall 10 or 11 flat against the selected area, by means such as headed bolts 45, passed through openings in the selected affixing wall 10 or 11 and embedded into the wall structure of the selected area or affixed in a room corner with both walls 10 and 11 flat against the adjacent right angled areas which form the corner. In this relation, the angularity of the connecting web 16 leaves a space therebeneath, which is desirable since room corners are not always sharply defined.

The following further observations will be made of the showing in other figures of the drawings:

Since the exterior surface of the encasement bounding walls 10 and 11 and of the end closure walls 14 are flat, a group of luminous units or blocks can be installed in end-to-end or longitudinally extended relation as shown of units L1 and L2 in Figure 4 to constitute a luminous trimming of any length or in the side-to-side or lateral relation of units L3 and L4 in Figures 5, 6, 8 and 9 of the drawings, or both to constitute a luminous structure whose overall shape is semi-cylindrical.

The significance of these observations is this: a unit can without modification, be affixed to any room area in any of the positions or relations shown in Figures 5 to 14; in these various positions or relations, its illumination may be either wholly direct or wholly indirect; the totality of illumination from a plurality of units can be distributed by increments selectively throughout a room space and proportioned to the requirements of various component spaces or areas comprised in the room and selectively as between direct and indirect illumination so that thereby the illumination can be said to be molded as desired to the requirements of a particular room space; for this attainment, my invention contemplates a luminous block to serve as an elemental unit for a system of room illumination by assemblies of such units for decorative as well as lighting purposes.

Figures 5 to 14 illustrate various ways in which my luminous units or blocks may be assembled or distributed. Figure 5 for example may be considered as either a vertical section through the room ceiling 50 (51 and 52 representing opposite walls); or it may represent a horizontal section through an end of the room in which event 50, 51 and 52 indicate three wall portions. Units or blocks L3 and L4 are shown in lateral adjacency to form a composite structure whose shape is semi-cylindrical. This composite structure may be extended along one or more walls or across the ceiling for the full length, width or height of the room space by the multiplication of the units L3 and L4 in end to end relation, to thus trim the walls or ceiling of the room. Figure 5 shows this assembly as a single line or row of units. Figure 6 duplicates the assemblies L3 and L4 of Figure 5 to provide parallel trimmings symmetrically of a wall or ceiling which may be required for a larger room space.

Figures 5 and 6 and Figure 10 illustrate trimming horizontally or vertically extending room corners by luminous blocks L5 and L6 or L20 and L21, which are received therein in end to end relation for the full length thereof. Figure 12 illustrates the corner trimming by one or more luminous blocks L29 to illuminate picture 61.

Figures 7, 8, 9 and 10 illustrate the use of my luminous blocks for masking or trimming protruding beams. In Figure 7 the blocks L7 and L8 trim the inner corners of beam 55. In Figure 10 the units L3 and L4 trim the lower surfaces of the beam $55^3$. Figure 8 combines the trimming of Figures 7 and 10 for beam 55' by units L9, L10, L11 and L12. Figure 9 trims each outer corner of beam $55^2$ by units L13, L14 and L15 assembled in lateral relation. It will be observed that the beams of these figures are shown as differing in depth and width to demonstrate the flexibility in the luminous trimming of a beam structure by the use of my unit.

It will be understood that Figures 7, 8, 9 and 10 are illustrative examples of a few of the many ways in which beams may be trimmed to give effective illumination for dark spaces created thereby. These examples should be understood also as illustrating the extent to which projecting beams, hitherto considered obstacles or handicaps from the aspects of room architecture, decorativeness and illumination, become helpful mediums in these respects.

Cove lighting is considered highly desirable for decorative purposes. It has not been commonly employed hitherto because of the expense of its installation. Figure 11 exemplifies the simplicity with which my luminous blocks L25, L26, L27 and L28 provide indirect illumination for the cove and direct illumination for the room.

Figure 13 illustrates a treatment of a square post 60 in the room where four units L40 and L41 are secured about the post (only two are visible in Figure 13) with their front faces as shown in the drawings and with the light cast upwardly. A similar arrangement of four luminaires L42 and L43, however with the light directed downwardly, may be used instead of the luminaires L40 and L41 or the two may be combined as shown in Figure 13.

Figure 14 illustrates the trimming of an auditorium or the like for illuminating it in accordance with my invention. The ceiling is shown at 71 and the side wall is indicated at 70. Along one or both side walls and at a desired height there are secured units L50 and L51 in back-to-back superposed relation to give semi-cylindrical trim positioned horizontally, the direction of illumination as shown by the arrows being upward to the ceiling from L50 to give indirect illumination and downward from L51 to give direct illumination. This arrangement presents advantages for an auditorium, one of which will be pointed out. Room space of this character generally requires one type of illumination during the performance and a different type at other times. This alternation in illumination can be effected in the arrangement of Figure 14 by activating both luminaires to give semi-direct illumination or only the lower luminaire L51 to give direct illumination during intermission or activating only L50 during the concert to give wholly indirect illumination.

It will be observed as the drawings are studied that my luminous blocks permit of a wide variety of assemblies for the correlation, architecturally and decoratively, of luminous units and room space and for efficiency of illumination. In fact the assembly may include units which are merely dummies, to enhance the decorative effect.

For most commercial purposes, the length of the unit shown in Fig. 2 may be in the neighborhood of 24 inches. Based on an assumed length of 24 inches, the width of the walls 10 and 11 and therefore the depth and width of the unit can be approximated as being about 6 inches, which is the extent to which a unit affixed to the wall will project therebeyond. The significance of this will be appreciated particularly when taken with the contour of the front closure member 12, which can be designed, for example as shown in Figures 2 and 3, to give a harmonizing effect somewhat as does the molding in a room or, better, a cornice of a room. This exemplifies another respect in which I attain a flexible architectural and decorative correlation. Reference has been made to proportions and dimensions only to indicate their bearing on this aspect of my invention.

While my unit has been illustrated as employing two fluorescent tubes, the major objects of my invention can, however, be effectively attained by units which employ a single tube or multiples thereof in excess of two, with the other components thereof, such as the reflectors, changed as required by the different number of tubes employed.

The units are shown as affixed to the room structure by members 10 and 11, which take the form of walls which are longitudinally extended for the full length of the luminaire to give these affixing means, as already pointed out, the added functions of serving to encase the luminaire and to provide a space between walls 10 and 11 and the reflector which serves as a wire way, i. e., a passageway for wiring and accessories which complies with fire and other regulations. Where it is desired to dispense with the aforementioned functions other than the affixing one, only sufficient of the walls 10 and 11 need be retained or other equivalent means employed as are necessary merely for affixing purposes.

The disclosure of the units of Figures 2 and 3 has been made by reference to component parts of predetermined conformation which require only assembly and fixing. These component parts can be prefabricated and shipped to the point of use, either fully assembled or disassembled, for assembly and installation on the premises.

I will now set forth a procedure permitted by my invention whereby the unit can be in a sense fabricated, assembled and installed on the premises as a continuous procedure. The walls 10 and 11, which form an integral component, and the member 12 are uniform in cross section throughout their length in all respects including thickness, width, length, contours, etc. The same is true of reflectors 25 and 26 which are integrated by web 27. It can therefore be said of these three components that they are longitudinally extended parts each identical in every cross section thereof. This characteristic of these component parts permits a manner of installation which presents advantages from the standpoint of time and expense and in which the fabrication, assembly and installation on the premises can be considered or become a single continuously integrated procedure as will now be pointed out by reference to Figure 1 wherein X represents an extended length which is contoured and dimensioned to the shape of the integral encasement component comprised of elements 10, 11 and 16 (see Figure 3) and from which a section of predetermined length can be cut to serve as this component in the luminaire of Figures 2 and 3. So also the member to which a reference character Y has been applied in Figure 1 represents an extended length shaped and dimensioned in cross section precisely as is the reflector component comprising elements 25, 26 and 27 from which a predetermined length can be cut to serve as the composite reflector in Figures 2 and 3. In the same way the front closure component 12 can be cut from an extended length. I have shown in Figure 1 the front closure members 12 as prefabricated, i. e., already cut into sections 12 of the required length. This different manner of treatment is suggested for the last mentioned component because where made of plastic, as is likely to be the case, it will be difficult to fabricate and handle extended lengths. I have therefore shown this particular component as prefabricated to length.

Figure 4 illustrates units L1 and L2, in the end to end or linearly extended relation which characterizes the luminous trimming contemplated by my invention. The end closure members 14 are shown as provided with the inwardly directed circular flanges 14' received snugly within walls 10 and 11 and secured thereto in any preferred or desired manner as by the means $14^2$ shown in this figure. The units L1 and L2 can be secured with end walls 14 in abutting relation as shown in any preferred or desired manner.

The disclosure has thus far been by reference to an embodiment wherein the light from the source is directed at an angle of 45° as is indicated by the arrows in each of the figures. It has been so disclosed because this angle is considered adequate for most room spaces. There are, however, conditions for which such angle may prove inadequate. One such condition is a room whose ceiling is unusually high. A second such condition is a room whose ceiling is unusually low. The reason for the inadequacy in these cases arises from the fact that the working plane of the room is fixed at a certain height above the floor and where the luminaire is affixed to the ceiling, or the illumination is by reflection from the ceiling, the height of the ceiling will affect the character of the illumination in the working plane.

I have therefore shown in Figure 15 a room whose ceiling $C^{15}$ is abnormally high with units L30 and L31 affixed thereto which are slightly modified to provide for this abnormal ceiling height as indicated by the arrows associated therewith which show that the light is being directed downwardly, however at an angle approximately 60°. I shall now proceed to describe an arrangement whereby this changed angle is arrived at by reference to Figure 16.

Figure 16 shows a unit precisely like that shown in Figure 3 with the one exception shortly to be referred to. For convenience of disclosure the same reference characters have been applied to the same parts in Figure 16 as in Figure 3 except that they are primed and the disclosure made of Figure 3 will therefore be read as also applying to Figure 16 except that in Figure 16 it will be observed that prisms 35 are formed on the inner surface of the light transmitting portions 70 and 71 of the front closure member of such character that they deflect the direction of the illumination from the 45° angle imposed by the reflectors 25' and 26' to an angle of 60° and 30° with relation to the two walls 10' and 11'.

The unit of Figure 3 has already been described as symmetrical about the radial plane midway between the walls 10 and 11 and therefore reversible as to its ends. The added significance of this is illustrated in Figure 17 wherein I show a room whose ceiling $C^{17}$ is abnormally low and wherein the same luminaires, which are illustrated in Figure 15 as directing their illumination downwardly at an angle of 60°, now direct their illumination downwardly at an angle of 30°.

The aforementioned angle of 60° and 30° will be understood merely as illustrative of the range of changes in this angle and indicative of the extent to which the special illuminating requirements of room space can be met by the system of illumination herein disclosed and the type of lighting unit about which it revolves. It will be understood that this changed angle requires in this embodiment only a change in the front closure member 12 and where for installation purposes a member such as shown at 12 in Figure 1 is employed, a similar change also in that member.

Upon reference to Figure 3 it will be observed that a spacer member 28 received over the bolt 40 is shown as interposed between web portions 27 and 32. This member may be internally threaded to engage threads 43 at the lower end of the bolt to hold the remaining parts assembled while the front closure member 12 is removed for servicing or for replacement of fluorescent lamps 20 or 21 or for the substitution of another type of front closure member, for example such as shown in Figure 16.

Upon reference to Figure 16 of the drawings it will be observed from the arrows that the direction of illumination is controlled in part by reflectors 25' and 26' and in part by the prismatic formation 35 on the front closure portions 70 and 71. It will be understood that the direction of illumination shown in Figure 16 can be controlled entirely by the reflectors.

Figures 1 to 17 illustrate arrangements wherein the units are in flush engagement with room surface areas. Figure 18 shows arrangements wherein a unit or an assembly of units is suspended from and at a distance from the ceiling by suspending means such as 84. 80 shows an assembly of semi-cylindrical conformation; 81 shows a cylindrical assembly comprised of 4 luminaires; 82 shows a three-quarters cylindrical assembly comprised of 3 units; and 83 shows a single unit. These further exemplify the wide variation permitted by my invention for illuminating room space.

My unit is comprised essentially of a casing defined by walls at right angles to each other and of a lighting assembly nested therewithin and comprised of a reflector presented convexly thereto to provide a space therebetween within which the fluorescent lamp is received. Its correlation to the room structure can be such that only the diffuser is visible to thereby give the unit the effect of a luminous block.

Having thus described my invention and illustrated its use, what I claim as new and desire to secure by Letters Patent is:

1. An illuminating block, having a base, comprising a pair of lateral walls forming a right dihedral angle and a pair of sector-shaped end walls at right angles thereto, a centrally cusped duplex concave reflector extending within said dihedral angle near the outer part thereof, a pair of tubular lamps in the respective concavities of the duplex reflector and carried by the sector-shaped end walls, an outwardly convex centrally cusped duplex light-diffusing face plate spanning the area between the forward edges of said base, and bolts extending through the vertex of the dihedral angle and the cusps of the reflector and face plate for maintaining the parts in assembled relation.

2. An illuminating installation comprising a multiplicity of substantially identical illuminating blocks, each block being substantially of the construction recited in claim 1, said illuminating blocks being correlated with the wall of a room and with each other in face-to-face engagement, concealing all lateral and end walls of the several illuminating blocks and exposing to view only the light-diffusing face plates thereof in a room-trimming.

3. A system for illuminating room space by a construction built up of unit blocks, one surface of which can be rendered luminous, assembled to present the said block surfaces as a continuous architectural room trim capable when rendered luminous of illuminating the said room space, each of said blocks comprising two lateral walls forming a right dihedral angle and sector-shaped end walls, the said block surface being a light-diffusing plate spanning the area defined by the distal edges of the said walls, the said plate extending to the outside face of the said end walls to enable the ends of the plates of adjacent longitudinally assembled blocks to abut, and extending to the outside face of the said lateral walls of the unit block to enable longitudinal edges of the plate to be brought into abutting relation with laterally adjacent blocks or with the wall surface of the room, to present a continuous plate surface as the said continuous architectural room trim, each of the said blocks further comprising an arcuate reflector disposed within the space defined by the lateral walls and a tubular lamp supported between the said reflector and light-diffusing plate, the said reflector and lamp extending longitudinally of the blocks to supply uniform lighting throughout the length of said continuous room trim.

4. A system for illuminating room space by a construction built up of unit blocks, one surface of which can be rendered luminous, assembled to present the said block surfaces as a continuous architectural room trim capable when rendered luminous of illuminating the said room space, each of said blocks comprising two lateral walls forming a right dihedral angle and sector-shaped end walls, the said block surface being a light-diffusing plate spanning the area defined by the distal edges of the said walls, the right dihedral angle of the said lateral walls being fitted in a corner formation of the room, the said plate extending to the outside face of the said end walls to enable the ends of the plates of adjacent longitudinally assembled blocks to abut, and extending to the outside face of the said lateral walls of the unit block to enable longitudinal edges of the plate to be brought into abutting relation with the wall surface of the room, to present a continuous plate surface subtending a corner angle of 90° as the said continuous architectural room trim, each of the said blocks further comprising an arcuate reflector disposed within the space defined by the lateral walls and a tubular lamp supported between the said reflector and light-diffusing plate, the said reflector and lamp extending longitudinally of the blocks to supply uniform lighting throughout the length of said continuous room trim.

5. A system for illuminating room space by a construction built up of unit blocks, one surface of which can be rendered luminous, assembled to present the said block surfaces as a continuous architectural room trim, capable when rendered luminous of illuminating the said room space, each of said blocks comprising two lateral walls forming a right dihedral angle and sector-shaped end walls, the said block surface being a light-diffusing plate spanning the area defined by the distal edges of the said walls, two rows of the unit blocks being installed, with lateral walls in abutting relation, along a flat surface of the room, the said plate extending to the outside face of the said end walls to enable the ends of the plates of adjacent longitudinally assembled blocks to abut, and extending to the outside face of the said lateral walls of the unit block to enable longitudinal edges of the plate to be brought into abutting relation with laterally adjacent blocks or with the wall surface of the room, to present a continuous plate surface subtending an angle of 180° as the said continuous architectural room trim, each of the said blocks further comprising an arcuate reflector disposed within the space defined by the lateral walls and a tubular lamp supported between the said reflector and light-diffusing plate, the said reflector and lamp extending longitudinally of the blocks to supply uniform lighting throughout the length of said continuous room trim.

6. A system for illuminating room space by a construction built up of unit blocks, one surface of which can be rendered luminous, assembled to present the said block surfaces as a continuous architectural room trim, capable when rendered luminous of illuminating the said room space, each of said blocks comprising two lateral walls. forming a right dihedral angle and sector-shaped end walls, said walls having their outer surface flat and free of protuberances to enable unit blocks to be assembled in close adjacency in end to end and side by side relation, the said block surface being a light-diffusing plate spanning the area defined by the distal edges of the said walls, the said plate extending to the outside face of the said end walls to enable the ends of the plates of adjacent longitudinally assembled blocks to abut, and extending to the outside face of the said lateral walls of the unit block to enable longitudinal edges of the plate to be brought into abutting relation with laterally adjacent blocks or with the wall surface of the room, to present a continuous plate surface as the said continuous architectural room trim, each of the said blocks further comprising an arcuate reflector disposed within the space defined by the lateral walls and a tubular lamp supported between the said reflector and light-diffusing plate, the said reflector and lamp extending longitudinally of the blocks to supply uniform lighting throughout the length of said continuous room trim.

7. A system for illuminating room space by a construction built up of unit blocks, one surface of which can be rendered luminous, assembled to present the said block surfaces as a continuous architectural room trim, capable when rendered luminous of illuminating the said room space, each of said blocks comprising two lateral walls forming a right dihedral angle and sector-shaped end walls, the said block surface being a light-diffusing plate spanning the area defined by the distal edges of the said walls, three rows of the unit blocks being installed, with lateral walls in abutting relation about the corner of a room formation presenting a reentrant right angle, the said plate extending to the outside face of the said end walls to enable the ends of the plates of adjacent longitudinally assembled blocks to abut, and extending to the outside face of the said lateral walls of the unit block to enable longitudinal edges of the plate to be brought into abutting relation with laterally adjacent blocks or with the wall surface of the room, to present a continuous plate surface subtending an angle of 270° as the said continuous architectural room trim, each of the said blocks further comprising an arcuate reflector disposed within the space defined by the lateral walls and a tubular lamp supported between the said reflector and light-diffusing plate, the said reflector and lamp extending longitudinally of the blocks to supply uniform lighting throughout the length of said continuous room trim.

MORRIS B. BECK.

REFERENCES CITED

The following references are of record in the file of this patent:

UNITED STATES PATENTS

| Number | Name | Date |
|---|---|---|
| 2,274,612 | Johnston | Feb. 24, 1942 |
| 2,283,782 | Ashley et al. | May 19, 1942 |
| 2,290,301 | Stair | July 21, 1942 |
| 2,293,672 | Bookman | Aug. 18, 1942 |
| 2,323,002 | Baker | June 29, 1943 |
| 2,330,924 | Rolph | Oct. 5, 1943 |
| 1,022,878 | Ryan | Apr. 9, 1912 |
| 1,825,010 | Murphy | Sept. 29, 1931 |
| 2,101,289 | Victoreen | Dec. 7, 1937 |
| 2,182,434 | Huhl | Dec. 5, 1939 |

FOREIGN PATENTS

| Number | Country | Date |
|---|---|---|
| 24,486 | Great Britain | 1911 |
| 394,295 | Great Britain | 1933 |
| 734,792 | France | 1935 |

OTHER REFERENCES

Pages 8-9 of Efcolite Catalog H of Jan. 1940, by Efcolite Corp., Trenton, N. J.

Page 7 of Bulletin #4, supplement to Catalog #40, by Ender Manufacturing Corp., 260 West St., New York, N. Y.

Page 8 of Garcy Catalog No. 39, by Garden City Plating and Manufacturing Co., Cor. Ogden Blvd. and S. Talman Ave., Chicago, Ill.

Page 7 of Efcolite Catalog H of January 1940.